(12) United States Patent
Doll (10) Patent No.: US 7,314,113 B2
(45) Date of Patent: Jan. 1, 2008

(54) ACOUSTIC ABSORBERS FOR USE WITH COMPUTER CABINET FANS AND OTHER COOLING SYSTEMS

(75) Inventor: Wade J. Doll, Seattle, WA (US)

(73) Assignee: Cray Inc., Seattle, WA (US)

( * ) Notice: Subject to any disclaimer, the term of this patent is extended or adjusted under 35 U.S.C. 154(b) by 301 days.

(21) Appl. No.: 10/940,446

(22) Filed: Sep. 14, 2004

(65) Prior Publication Data

US 2006/0054380 A1   Mar. 16, 2006

(51) Int. Cl.
*G10K 11/00* (2006.01)
*H02K 5/24* (2006.01)
*F01N 1/02* (2006.01)

(52) U.S. Cl. .................. 181/225; 181/224; 181/200; 181/202; 181/205; 181/292; 415/211.1; 415/211.2; 415/208.4; 415/209.1; 165/135

(58) Field of Classification Search ............ 165/135; 181/224, 225, 200, 202, 205, 210, 292; 415/211.1, 415/211.2, 208.1, 208.2, 208.4, 209.1, 209.3, 415/209.4
See application file for complete search history.

(56) References Cited

U.S. PATENT DOCUMENTS

| 2,628,018 | A | * | 2/1953 | Koch ........................ 415/186 |
| 4,473,382 | A | * | 9/1984 | Cheslock ...................... 96/58 |
| 4,874,127 | A |   | 10/1989 | Collier |
| 5,019,880 | A | * | 5/1991 | Higgins, III. ............... 257/714 |
| 5,297,990 | A | * | 3/1994 | Renz et al. ................. 454/187 |
| 5,326,317 | A | * | 7/1994 | Ishizu et al. ............... 454/354 |
| 5,339,214 | A |   | 8/1994 | Nelson |
| 5,345,779 | A |   | 9/1994 | Feeney |
| 5,491,310 | A | * | 2/1996 | Jen ........................... 181/286 |
| 5,707,205 | A | * | 1/1998 | Otsuka ...................... 415/119 |
| 5,749,702 | A | * | 5/1998 | Datta et al. ................. 415/119 |
| 5,979,541 | A | * | 11/1999 | Saito ......................... 165/80.3 |
| 6,104,608 | A | * | 8/2000 | Casinelli et al. ............ 361/692 |
| 6,132,171 | A | * | 10/2000 | Fujinaka et al. ......... 415/208.5 |
| 6,182,787 | B1 | * | 2/2001 | Kraft et al. ................. 181/292 |

(Continued)

FOREIGN PATENT DOCUMENTS

JP          2004-79754          8/2002

(Continued)

*Primary Examiner*—Lincoln Donovan
*Assistant Examiner*—Jeremy Luks
(74) *Attorney, Agent, or Firm*—Perkins Coie LLP (57) ABSTRACT

Systems and methods for absorbing acoustic noise generated by computer cabinet cooling fans are described herein. In one embodiment, an acoustic absorber for use with a fan carried by a computer cabinet in a room includes a first acoustic panel spaced apart from a second acoustic panel. The first acoustic panel is configured to be positioned proximate to an outlet of the fan and at least approximately parallel to a flow of cooling air discharging from the outlet. The second acoustic panel is also configured to be positioned proximate to the outlet of the fan and at least approximately parallel to the flow of cooling air discharging from the outlet. The first and second acoustic panels together form an opening configured to direct the flow of cooling air away from the fan outlet and into the surrounding room. In a further embodiment, the opening formed by the first and second acoustic panels can be configured to extend at least approximately 360 degrees around the fan.

50 Claims, 5 Drawing Sheets

U.S. PATENT DOCUMENTS

| | | | |
|---|---|---|---|
| 6,183,196 B1 * | 2/2001 | Fujinaka | 415/208.5 |
| 6,439,340 B1 * | 8/2002 | Shirvan | 181/213 |
| 6,501,652 B2 * | 12/2002 | Katsui | 361/697 |
| 6,524,064 B2 * | 2/2003 | Chou et al. | 415/119 |
| 6,582,192 B2 * | 6/2003 | Tseng | 415/211.1 |
| 6,609,592 B2 * | 8/2003 | Wilson | 181/292 |
| 6,690,576 B2 * | 2/2004 | Clements et al. | 361/695 |
| 6,755,280 B2 * | 6/2004 | Porte et al. | 181/290 |
| 6,776,707 B2 | 8/2004 | Koplin | |
| 2002/0181200 A1 | 12/2002 | Chang | |
| 2003/0056941 A1 | 3/2003 | Lai et al. | |
| 2003/0161102 A1 * | 8/2003 | Lee et al. | 361/687 |
| 2003/0183446 A1 * | 10/2003 | Shah et al. | 181/205 |
| 2004/0008491 A1 | 1/2004 | Chen | |
| 2004/0033135 A1 * | 2/2004 | Chang | 415/220 |
| 2004/0052052 A1 | 3/2004 | Rivera | |

FOREIGN PATENT DOCUMENTS

| | | |
|---|---|---|
| WO | WO-2005/027609 | 3/2005 |

\* cited by examiner

ACOUSTIC ABSORBERS FOR USE WITH COMPUTER CABINET FANS AND OTHER COOLING SYSTEMS

TECHNICAL FIELD

The following disclosure relates generally to air conditioning systems for computer cabinets and, more particularly, to methods and systems for absorbing noise generated by such air conditioning systems.

BACKGROUND

Figure 1:
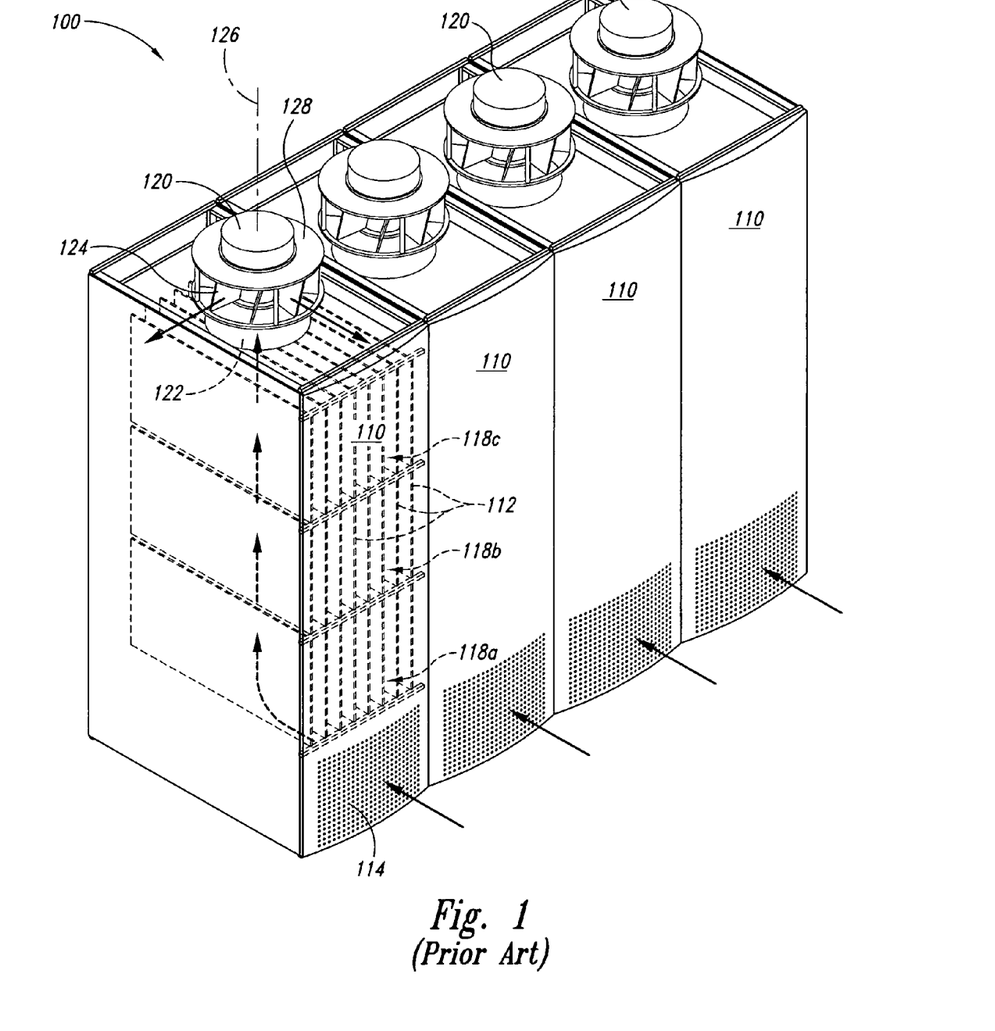
FIG. 1 is an isometric view of a bank of computer cabinets having top-mounted cooling fans configured in accordance with the prior art.

Supercomputers and other large computer systems typically include a large number of computer cabinets arranged in close proximity to each other. FIG. 1, for example, illustrates a portion of a prior art supercomputer system 100 having plurality of computer cabinets 110 arranged in a bank. The computer cabinets 110 are arranged in a bank to conserve floor space and increase computational speed by reducing cable lengths between cabinets. Each of the computer cabinets 110 includes a plurality of computer module compartments 118 (identified individually as a first module compartment 118a, a second module compartment 118b, and a third module compartment 118c). Each module compartment 118 holds a plurality of computer modules 112. Like the computer cabinets 110, the computer modules 112 are also positioned in close proximity to each other to conserve space and increase computational speed. Each of the computer modules 112 can include a motherboard electrically connecting a plurality of processors, routers, and other microelectronic devices together for data and/or power transmission.

Many of the electronic devices typically found in supercomputers, such as fast processing devices, generate considerable heat during operation. This heat can damage the device and/or degrade performance if not dissipated during operation. Consequently, supercomputers typically include both active and passive cooling systems to maintain device temperatures at acceptable levels.

To dissipate the heat generated by the computer modules 112, the prior art supercomputer system 100 further includes a plurality of centrifugal fans 120. Each of the centrifugal fans 120 includes a housing 128 mounted to an upper portion of a corresponding computer cabinet 110. Each housing 128 includes a central inlet 122 aligned with an axis of rotation 126, and a circumferential outlet 124 extending around the outside of the housing 128. In operation, the centrifugal fan 120 draws cooling air into the corresponding computer cabinet 110 through a front inlet grill 114 positioned toward a bottom portion of the computer cabinet 110. The cooling air flows upwardly through the computer cabinet 110, past the computer modules 112, and into the central inlet 122. The centrifugal fan 120 then exhausts the cooling air outward in a radial pattern through the circumferential outlet 124.

One problem associated with the prior art supercomputer system 100 is the substantial noise generated by the centrifugal fans 120 during operation. The noise can make working in the vicinity of the computer cabinets 110 difficult or uncomfortable, especially for extended periods of time (e.g., for an 8-hour day). Further, in some instances, the noise can exceed regulations that require, e.g., noise levels of less than 90db in those environments in which persons are working for up to eight hours in a given day.

Figure 2:
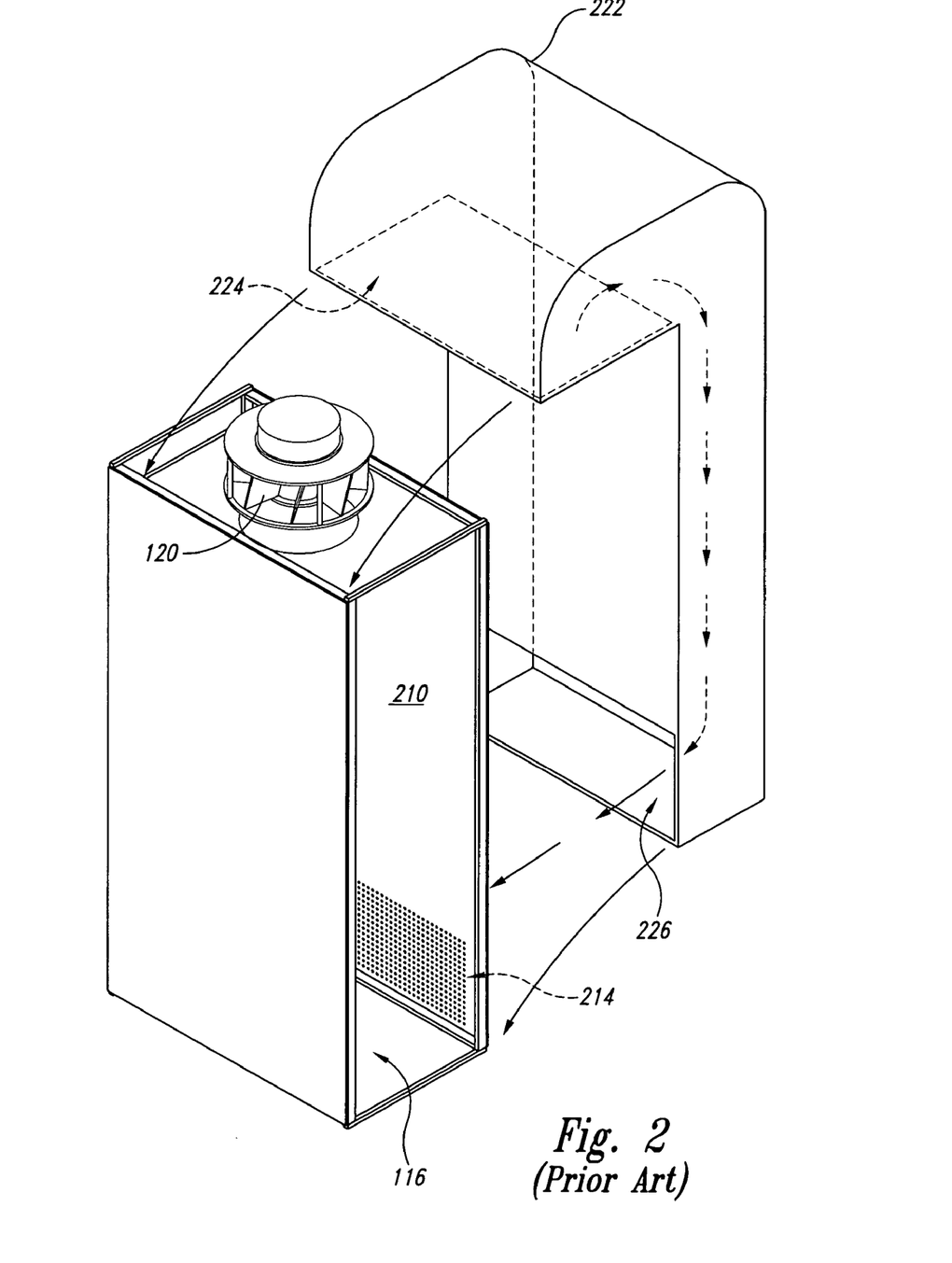
FIG. 2 is an isometric view of a computer cabinet having a top-mounted cooling fan and a noise-suppressing recirculation duct configured in accordance with the prior art.

FIG. 2 is a partially exploded isometric view of a computer cabinet 210 illustrating one method for absorbing fan noise in accordance with the prior art. This method involves use of a recirculation duct 222 having an inlet opening 224 and an outlet opening 226. The recirculation duct 222 is attached to the computer cabinet 210 in such a way that the inlet opening 224 fully encloses the centrifugal fan 120. This arrangement positions the outlet opening 226 directly adjacent to a side inlet grill 214 on the computer cabinet 210. In operation, the recirculation duct 222 routes used cooling air from the centrifugal fan 120 back through the computer cabinet 210 via the side inlet grill 214. Because the recirculation duct 222 is totally closed off from the surrounding environment, much of the noise generated by the centrifugal fan 120 is contained within the recirculation duct 222.

There are a number of shortcomings associated with the prior art noise-reduction solution illustrated in FIG. 2. One shortcoming is the additional floor space consumed by adding the recirculation duct 222 to each of the computer cabinets 210. Not only does this approach consume more floor space, but it also decreases computational speed by increasing cable lengths between adjacent cabinets. Another shortcoming is that the recirculation duct 222 adds substantial back pressure to the flow of cooling air. As a result, the centrifugal fan 120 must operate at a higher speed than in the un-muffled system of FIG. 1 to provide the same air flow rate. Increasing fan speed, however, has the negative effect of increasing noise, power usage, and heat. A further downside associated with the approach illustrated in FIG. 2 is the cost associated with manufacturing, installing, and maintaining the recirculation ducts 222.

DETAILED DESCRIPTION

The following disclosure describes several embodiments of acoustic absorbers for use with computer cabinet cooling fans and other air-conditioning systems. One aspect of the invention is directed to an acoustic absorber for use with a fan carried by a computer cabinet in a room. The fan includes an inlet configured to receive a flow of cooling air from within the computer cabinet, and an outlet configured to discharge the flow of cooling air away from the computer cabinet. In this aspect of the invention, the acoustic absorber includes a first acoustic panel spaced apart from a second acoustic panel. The first acoustic panel is configured to be positioned proximate to the outlet of the fan and at least approximately parallel to the flow of cooling air discharging from the outlet. The second acoustic panel is also configured to be positioned proximate to the outlet of the fan and at least approximately parallel to the flow of cooling air discharging from the outlet. Together, the first and second acoustic panels form an opening configured to direct the flow of cooling air away from the fan outlet and into the room.

A cooling system configured in accordance with another aspect of the invention includes a fan configured to be carried by a computer cabinet in a room. The fan includes an inlet configured to receive a flow of cooling air from within the computer cabinet, and an outlet configured to discharge the flow of cooling air away from the computer cabinet. The cooling system further includes a first acoustic panel positioned proximate to the outlet of the fan, and a second acoustic panel spaced apart from the first acoustic panel and positioned proximate to the outlet of the fan. Together, the first and second acoustic panels form an opening configured to direct the flow of cooling air away from the fan outlet and into the room.

A further aspect of the invention is directed to a method for absorbing acoustic noise from a fan carried by a computer cabinet in a room. The method includes positioning first and second acoustic panels proximate to an outlet of the fan and spaced apart from each other to form an opening. The method further includes operating the fan to move cooling air from within the computer cabinet into the room by passing the cooling air between the first and second acoustic panels and through the opening.

Specific details of several embodiments of the invention are described below with reference to FIGS. 3-5C to provide a thorough understanding of the embodiments. Other details describing well-known structures and systems often associated with computer cabinets and associated air-conditioning fans, however, are not set forth below to avoid unnecessarily obscuring the description of the various embodiments. Those of ordinary skill in the art will understand that the invention may have other embodiments in addition to those described below. Such embodiments may lack one or more of the elements described below. Alternatively, such embodiments may include other elements in addition to those described below.

In the Figures, identical reference numbers identify identical or at least generally similar elements. To facilitate the discussion of any particular element, the most significant digit or digits of any reference number refer to the Figure in which that element is first introduced. Element 310, for example, is first introduced and discussed with reference to FIG. 3.

Figure 3:
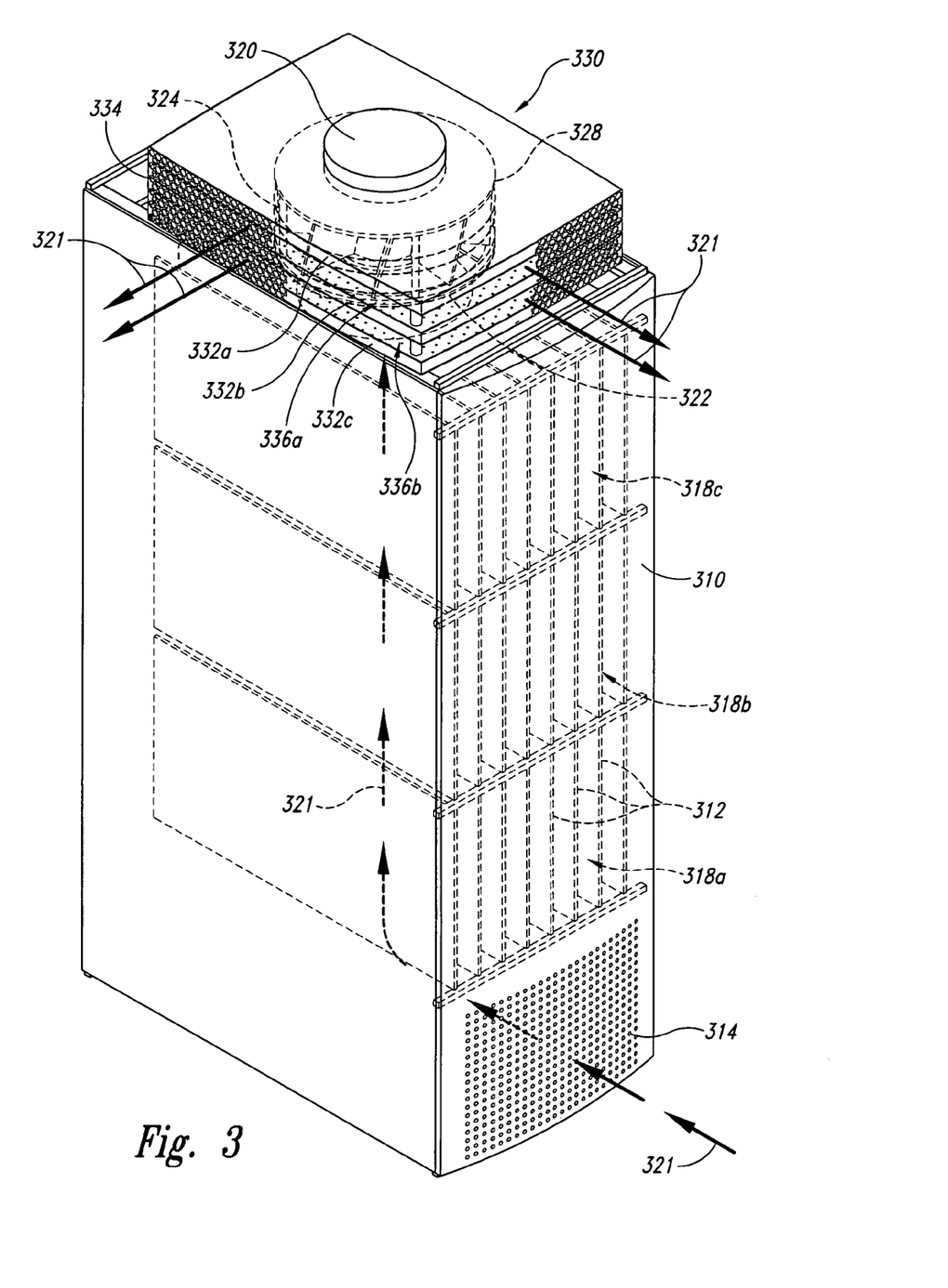
FIG. 3 is an isometric view of a computer cabinet having a cooling fan with an acoustic absorber configured in accordance with an embodiment of the invention.

FIG. 3 is a partially cut-away isometric view of a computer cabinet 310 supporting an air mover 320 and an associated acoustic absorber 330 configured in accordance with an embodiment of the invention. In the illustrated embodiment, many aspects of the computer cabinet 310 and the air mover 320 are at least generally similar in structure and function to the computer cabinet 110 and the centrifugal fan 120, respectively, described above with reference to FIG. 1. For example, the computer cabinet 310 includes a plurality of computer module compartments 318 holding a plurality of computer modules 312 in vertical, edge-wise orientation. Further, the air mover 320 of this embodiment is a centrifugal fan having a housing 328 that includes a central inlet 322 and a circumferential outlet 324. In operation, the air mover 320 draws cooling air (represented by arrows 321) into the computer cabinet 310 via a front inlet grill 314. The cooling air 321 moves upwardly through the computer cabinet 310 and past the computer modules 312, before flowing into the central inlet 322. The used cooling air is then discharged outwardly in a radial pattern from the circumferential outlet 324.

In one aspect of this embodiment, the acoustic absorber 330 includes a plurality of acoustic panels 332 (identified individually as a first acoustic panel 332a, a second acoustic panel 332b, and a third acoustic panel 332c) positioned proximate to the fan outlet 324 and at least approximately parallel to the flow of cooling air 321 discharging from the fan outlet 324. Together, the first acoustic panel 332a and the second acoustic panel 332b form a first opening 336a, and the second acoustic panel 332b and the third acoustic panel 332c form a second opening 336b. In the illustrated embodiment, the openings 336 extend for at least approximately 360 degrees around the air mover 320, and they direct the flow of cooling air 321 away from the fan outlet 324 and into the surrounding environment.

Although the illustrated embodiment shows three acoustic panels 332, in other embodiments, acoustic absorbers configured in accordance with the present disclosure can include more or fewer acoustic panels in similar arrangements. For example, in another embodiment, the second acoustic panel 332b can be omitted and the resulting acoustic absorber can include only two spaced-apart acoustic panels. In a further embodiment, an acoustic absorber configured in accordance with the present disclosure can include four or more acoustic panels in a spaced-apart, coplanar arrangement. Accordingly, the present invention is not limited to acoustic absorbers having three acoustic panels in the particular arrangement of FIG. 3.

In another aspect of this embodiment, the acoustic absorber 330 further includes an outlet screen 334 wrapping around the acoustic panels 332 and extending across the openings 336. In the illustrated embodiment, the outlet screen 334 is a highly-perforated sheet of suitable material, such as metal (e.g., aluminum) or non-metal (e.g., composites, plastics, and/or natural fiber-based materials). In other embodiments, the outlet screen 334 can be made from other materials, such as wire or fiber mesh. In further embodiments, the outlet screen 334 can be omitted.

Figure 4:
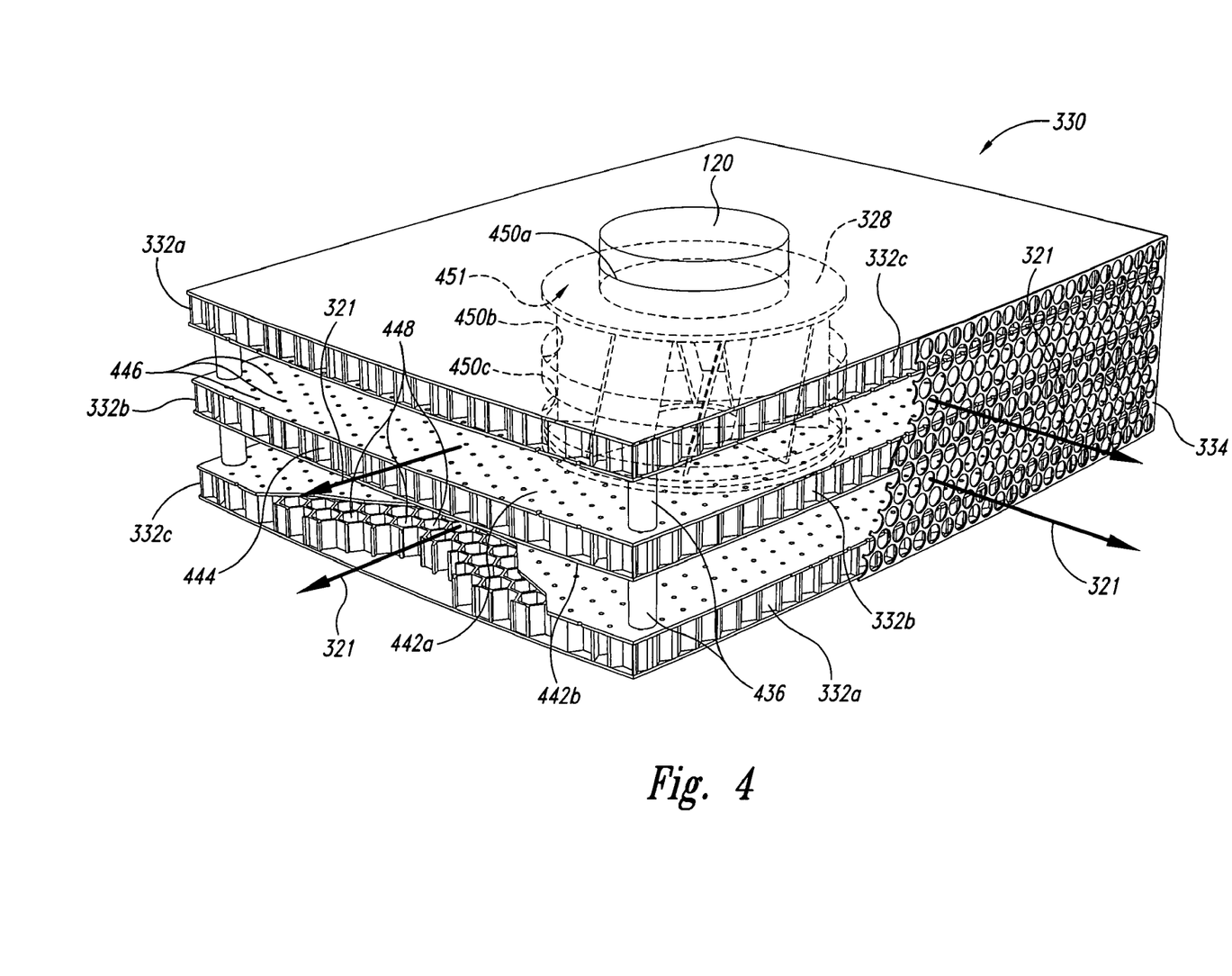
FIG. 4 is a partially cut-away, enlarged isometric view of the acoustic absorber of FIG. 3.

FIG. 4 is a partially cut-away, enlarged isometric view of the acoustic absorber 330 of FIG. 3 illustrating a number of features in greater detail. For example, FIG. 4 illustrates that a plurality of spacers 436 extend between the acoustic panels 332 and hold the panels in proper relation to each other. FIG. 4 also illustrates that each of the acoustic panels 332 of this particular embodiment includes an aperture 450 (identified individually as a first aperture 450a, a second aperture 450b, and a third aperture 450c, respectively). The second aperture 450b and the third aperture 450c are sized so that the acoustic absorber 330 fits snugly around the fan housing 328. The first aperture 450a is sized so that the first acoustic panel 332a rests directly on top of the fan housing 328. In this manner, the first aperture 450a forms part of a mounting portion 451 that positions the acoustic absorber 330 on the air mover 320.

In one aspect of this embodiment, each of the acoustic panels 332 includes a core 444 sandwiched between a first face sheet 442a and a second face sheet 442b. The core 444 can include a plurality of open cells 448, and the first face sheet 442a can include a plurality of holes 446. In the illustrated embodiment, the first face sheet 442a is bonded to the core 444 so that the holes 446 are at least approximately aligned with the cells 448 in one-to-one correspondence. In other embodiments, the holes 446 can be randomly placed relative to the cells 448.

The core 444 can be manufactured from any number of suitable materials, including honeycomb material having a cell size from about 0.25 inch to about 1.0 inch, and a panel thickness from about 1.0 inch to about 3.0 inches. For example, in one embodiment, the core 444 can be manufactured from polypropylene honeycomb material having a cell size of about 0.75 inch and a panel thickness of about 2.0 inches. The face sheets 442 can also be manufactured from a plurality of suitable materials, including sheet material having a thickness from about 0.01 inch to about 0.10 inch. For example, in one embodiment, the face sheets 442 can be manufactured from aluminum alloy sheet having a thickness of about 0.03 inch. The holes 446 in the first face sheet 442a can be from about 0.02 inch to about 0.10 inch in diameter. For example, in one embodiment, the holes 446 can be about 0.06 inch in diameter. In other embodiments, the core 444, the face sheets 442, and the holes 446 can have dimensions different than those set forth above depending on a number of different factors, including manufacturing, cost, and performance considerations.

As those of ordinary skill in the art will appreciate, the particular embodiment of acoustic panel described above is but one possible panel configuration that can be used with the present invention. Accordingly, in other embodiments, an acoustic absorber configured in accordance with the present disclosure can include other acoustic panel configurations without departing from the spirit or scope of the present disclosure. Such panel configurations can include, for example, panels similar to the acoustic panels 332 but with holes in both face sheets. Alternatively, in further embodiments, the holes can be omitted from both face sheets. In yet other embodiments, acoustic absorbers configured in accordance with the present invention can include panels manufactured from open or closed cell foam, such as polyurethane foam. Such panels may lack face sheets on one or both sides. Accordingly, the present invention is not limited to the particular type of acoustic panels described above.

There are a number of advantages associated with the acoustic absorber 330 when compared to the prior art recirculation duct 222 described above with reference to FIG. 2. One advantage is that the acoustic absorber 330 is integrally mounted to the air mover 120 so that sound is absorbed immediately at the source and not allowed to propagate into adjoining structures and/or the surrounding environment. Another advantage of this mounting arrangement is that it provides substantial acoustic absorption without sacrificing valuable floor space. A further advantage of the acoustic absorber 330 results from orienting the acoustic panels 332 at least approximately parallel to the flow of cooling air 321 discharging from the air mover 120. Orienting the acoustic panels in this manner results in relatively low pressure losses, while still providing adequate acoustic attenuation.

Figure 5A:
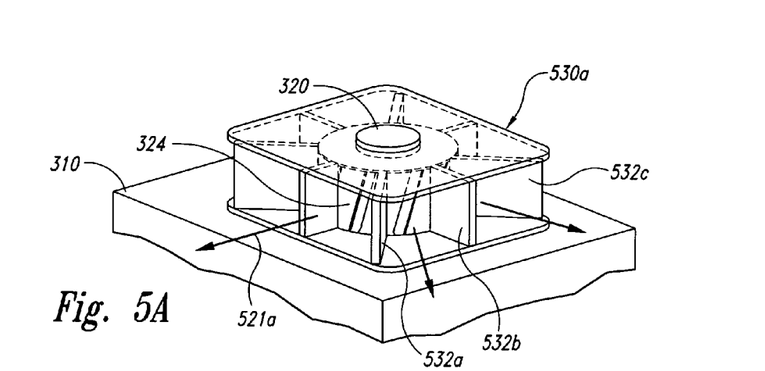
FIGS. 5A-C are isometric views illustrating acoustic absorbers configured in accordance with other embodiments of the invention.
Figure 5B:
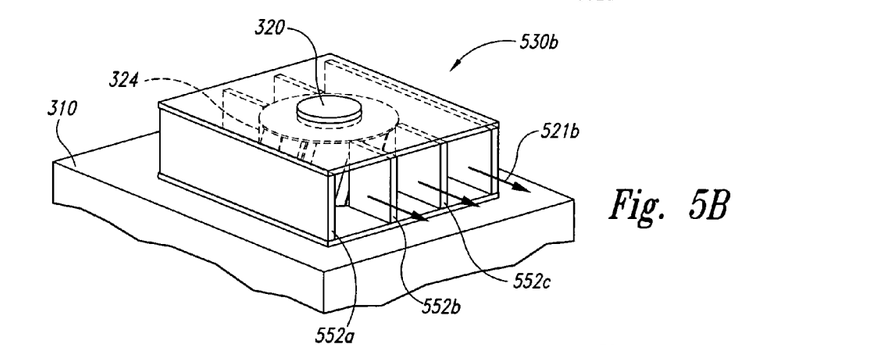
Figure 5C:
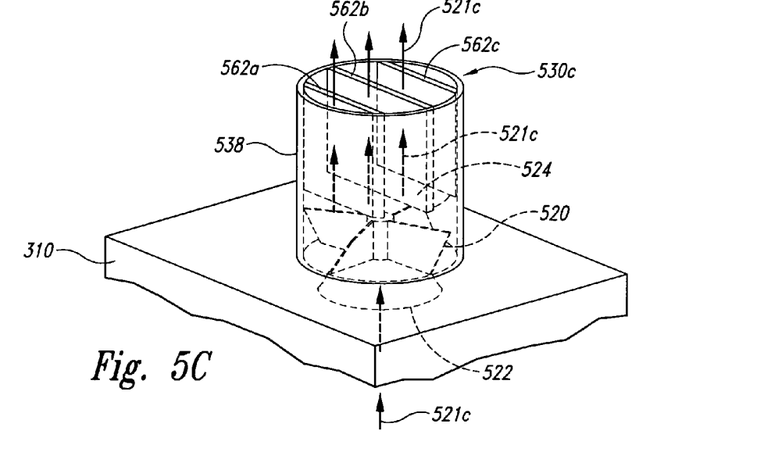

FIGS. 5A-C are isometric views of acoustic absorbers 530a-c configured in accordance with other embodiments of the invention. Referring first to FIG. 5A, the acoustic absorber 530a is positioned over the air mover 320 on an upper portion of the computer cabinet 310. In this embodiment, the acoustic absorber 530a includes a plurality of acoustic panels 532 (identified individually as a first acoustic panel 532a, a second acoustic panel 532b, a third acoustic panel 532c, etc.) extending outwardly from the air mover outlet 324 in a radial, sunburst pattern. The acoustic panels 532 can be at least generally similar in structure and/or function to the acoustic panels 332 described above with reference to FIGS. 3 and 4.

Referring next to FIG. 5B, the acoustic absorber 530b is also positioned over the air mover 320 on an upper portion of the computer cabinet 310. The acoustic absorber 530b of this embodiment, however, includes a plurality of acoustic panels 552 (identified individually as a first acoustic panel 552a, a second acoustic panel 552b, a third acoustic panel 552c, etc.) that extend outwardly from the air mover outlet 324 in a coplanar, unidirectional arrangement.

Referring next to FIG. 5C, this configuration differs from those illustrated in FIGS. 5A and 5B in that it involves an axial air mover 520. The axial air mover 520 receives cooling air from within the computer cabinet 310 via an axial inlet 522, and exhausts the cooling air upward via an axial outlet 524. The acoustic absorber 530c includes an outer cylindrical body 538 and a plurality of internal acoustic panels 562 (identified individually as a first acoustic panel 562a, a second acoustic panel 562b, and a third acoustic panel 562c). The acoustic panels 562 are arranged in a coplanar, vertical orientation. Both the cylindrical body 538 and the acoustic panels 562 can be noise-absorbing structures similar to the acoustic panels 332 described above with reference to FIGS. 3 and 4. In contrast to the acoustic absorbers 330, 530a, and 530b described above, however, the acoustic absorber 530c directs the cooling air away from the computer cabinet 310 in a vertical direction.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. An acoustic absorber for use with a fan carried by a computer cabinet in a room, wherein the fan includes an inlet configured to receive a flow of cooling air from within the computer cabinet, and an outlet configured to discharge the flow of cooling air away from the computer cabinet, wherein the acoustic absorber comprises:

a first acoustic panel configured to be positioned proximate to the outlet of the fan and at least approximately parallel to the flow of cooling air discharging from the outlet; and a second acoustic panel spaced apart from the first acoustic panel, wherein the second acoustic panel is configured to be positioned proximate to the outlet of the fan and at least approximately parallel to the flow of cooling air discharging from the outlet, and wherein the first and second acoustic panels together form an opening configured to direct the flow of cooling air away from the fan outlet and into the room.

2. The acoustic absorber of claim 1 wherein the opening formed by the first and second acoustic panels is configured to extend at least approximately 360 degrees around the fan.

3. The acoustic absorber of claim 1, further comprising a mounting portion configured to position the first and second acoustic panels on a housing of the fan.

4. The acoustic absorber of claim 1, further comprising a perforated screen extending across the opening formed by the first and second acoustic panels.

5. The acoustic absorber of claim 1 wherein the fan is a centrifugal fan having a cylindrical fan housing, and wherein the second acoustic panel is configured to extend at least approximately all the way around the cylindrical fan housing.

6. The acoustic absorber of claim 1 wherein the opening is a first opening, and wherein the acoustic absorber further comprises a third acoustic panel spaced apart from the second acoustic panel, wherein the third acoustic panel is configured to be positioned proximate to the outlet of the fan and at least approximately parallel to the flow of cooling air discharging from the fan outlet, and wherein the second and third acoustic panels together form a second opening configured to direct the flow of cooling air away from the fan outlet and into the room.

7. The acoustic absorber of claim 1 wherein the opening is a first opening, and wherein the acoustic absorber further comprises a third acoustic panel spaced apart from the second acoustic panel and parallel to the first and second acoustic panels, wherein the third acoustic panel is configured to be positioned proximate to the outlet of the fan and at least approximately parallel to the flow of cooling air discharging from the fan outlet, and wherein the second and third acoustic panels together form a second opening configured to direct the flow of cooling air away from the fan outlet and into the room.

8. The acoustic absorber of claim 1 wherein the fan includes a fan housing, and wherein at least the second acoustic panel includes an aperture configured to receive the fan housing.

9. The acoustic absorber of claim 1 wherein the fan includes a fan housing, wherein the acoustic absorber further comprises a third acoustic panel spaced apart from the second acoustic panel, and wherein at least the second and third acoustic panels include apertures configured to receive the fan housing.

10. The acoustic absorber of claim 1 wherein the fan outlet is configured to discharge the flow of cooling air outwardly in a radial pattern relative to a fan axis, and wherein the first and second acoustic panels are configured to be positioned at least approximately perpendicular to the fan axis.

11. The acoustic absorber of claim 1 wherein at least the second acoustic panel includes a perforated face sheet attached to a core.

12. The acoustic absorber of claim 1 wherein at least the second acoustic panel includes a core sandwiched between first and second face sheets, and wherein the first face sheet is perforated and the second face sheet is non-perforated.

13. The acoustic absorber of claim 1 wherein at least the second acoustic panel includes a face sheet attached to a core, wherein the face sheet includes a plurality of holes and the core includes a plurality of corresponding cells.

14. The acoustic absorber of claim 1 wherein the second acoustic panel is parallel to the first acoustic panel.

15. The acoustic absorber of claim 1 wherein the second acoustic panel is configured to extend at least partially across the outlet of the fan.

16. The acoustic absorber of claim 1 wherein the second acoustic panel is configured to at least partially split the flow of cooling air discharging from the outlet of the fan.

17. An acoustic absorber for use with a fan carried by a computer cabinet in a room, wherein the fan includes an inlet configured to receive a flow of cooling air from within the computer cabinet, and an outlet configured to discharge the flow of cooling air away from the computer cabinet, wherein the acoustic absorber comprises:
   a first acoustic panel configured to be positioned proximate to the outlet of the fan and at least approximately parallel to the flow of cooling air discharging from the outlet; and
   a second acoustic panel spaced apart from the first acoustic panel, wherein the second acoustic panel extends for at least approximately 360 degrees around the fan outlet, wherein the second acoustic panel is configured to be positioned proximate to the outlet of the fan and at least approximately parallel to the flow of cooling air discharging from the outlet, and wherein the first and second acoustic panels together form an opening configured to direct the flow of cooling air away from the fan outlet and into the room.

18. A cooling system for use with a computer cabinet in a room, the cooling system comprising:
   a fan configured to be carried by the computer cabinet, wherein the fan includes an inlet configured to receive a flow of cooling air from within the computer cabinet, and an outlet configured to discharge the flow of cooling air away from the computer cabinet;
   a first acoustic panel positioned proximate to the outlet of the fan; and
   a second acoustic panel spaced apart from the first acoustic panel and positioned proximate to the outlet of the fan, wherein the first and second acoustic panels together form an opening configured to direct the flow of cooling air away from the fan outlet and into the room.

19. The cooling system of claim 18 wherein the first and second acoustic panels are carried by the fan.

20. The cooling system of claim 18 wherein the first and second acoustic panels are integrally mounted to the fan.

21. The cooling system of claim 18 wherein the fan is a centrifugal fan having a central axis of rotation, and wherein the inlet is aligned with the central axis of rotation.

22. The cooling system of claim 18 wherein the fan is a centrifugal fan having a central axis of rotation, and wherein the outlet is configured to discharge the flow of cooling air outward in a radial pattern away from the central axis of rotation.

23. The cooling system of claim 18 wherein the fan inlet is configured to be positioned toward a top portion of the computer cabinet.

24. The cooling system of claim 18 wherein the fan is a centrifugal fan having a central axis of rotation, and wherein the first and second acoustic panels are at least approximately perpendicular to the central axis of rotation.

25. The cooling system of claim 18 wherein the fan is a centrifugal fan having a central axis of rotation, and wherein the opening formed by the first and second acoustic panels extends for at least approximately 360 degrees around the central axis of rotation.

26. A cooling system for use with a computer cabinet in a room, the cooling system comprising:
   a fan configured to be carried by the computer cabinet, wherein the fan includes an inlet configured to receive a flow of cooling air from within the computer cabinet, and an outlet configured to discharge the flow of cooling air away from the computer cabinet;
   a first acoustic panel positioned proximate to the outlet of the fan; and
   a second acoustic panel spaced apart from the first acoustic panel and positioned proximate to the outlet of the fan, wherein the first and second acoustic panels together form an opening configured to direct the flow of cooling air away from the fan outlet and into the room, wherein at least the second acoustic panel includes an aperture, and wherein the fan includes a housing positioned within the aperture.

27. A computer system in a room, the computer system comprising:
   a computer cabinet holding at least one computer module;
   an air mover positioned proximate to the computer cabinet, wherein the air mover is configured to move a flow of cooling air through the computer cabinet and past the computer module;

a first acoustic panel positioned proximate to the air mover; and a second acoustic panel spaced apart from the first acoustic panel and proximate to the air mover, wherein the first and second acoustic panels together form an opening configured to direct the flow of cooling air away from the air mover and into the room.

28. The computer system of claim 27 wherein the air mover is mounted to the computer cabinet.

29. The computer system of claim 27 wherein the air mover is a centrifugal fan mounted to the computer cabinet.

30. The computer system of claim 27 wherein the air mover is mounted to the computer cabinet, and wherein the acoustic absorber is at least partially supported by the air mover.

31. The computer system of claim 27 wherein the computer cabinet holds a plurality of computer modules in edge-wise orientation relative to the flow of cooling air.

32. The computer system of claim 27 wherein the computer cabinet includes an air inlet positioned toward a bottom portion of the computer cabinet, and wherein the air mover is mounted to an upper portion of the computer cabinet.

33. A computer system in a room, the computer system comprising:

a computer cabinet holding a plurality of computer modules;

a centrifugal fan carried by an upper portion of the computer cabinet, wherein the centrifugal fan includes an inlet configured to draw a flow of cooling air through the computer cabinet and past the plurality of computer modules, and an outlet configured to discharge the flow of cooling air away from the computer cabinet; and an acoustic absorber at least partially carried by the centrifugal fan, wherein the acoustic absorber comprises:

a first acoustic panel positioned proximate to the outlet of the centrifugal fan; and a second acoustic panel spaced apart from the first acoustic panel and positioned proximate to the outlet of the centrifugal fan, wherein the first and second acoustic panels together form an opening configured to direct the flow of cooling air away from the fan outlet and into the room.

34. The computer system of claim 33 wherein the opening formed by the first and second acoustic panels extends for at least approximately 360 degrees around the centrifugal fan.

35. The computer system of claim 33 wherein the acoustic absorber further comprises a perforated screen extending across the opening formed by the first and second acoustic panels.

36. The computer system of claim 33 wherein the opening is a first opening, and wherein the acoustic absorber further comprises a third acoustic panel spaced apart from the second acoustic panel, wherein the third acoustic panel is configured to be positioned proximate to the outlet of the centrifugal fan, and wherein the second and third acoustic panels together form a second opening configured to direct the flow of cooling air away from the fan outlet and into the room.

37. The computer system of claim 33 wherein at least the second acoustic panel includes a perforated face sheet attached to a core.

38. The computer system of claim 33 wherein at least the second acoustic panel includes a core sandwiched between first and second face sheets, and wherein the first face sheet is perforated and the second face sheet is non-perforated.

39. The computer system of claim 33 wherein at least the second acoustic panel includes a face sheet attached to a core, wherein the face sheet includes a plurality of holes and the core includes a plurality of corresponding cells.

40. A method for cooling a plurality of computer modules carried by a computer cabinet in a room, and for absorbing acoustic noise associated with the cooling, the method comprising:

mounting a fan to the computer cabinet;

positioning a first acoustic panel proximate to an outlet of the fan;

positioning a second acoustic panel proximate to the outlet of the fan and spaced apart from the first acoustic panel to form an opening; and operating the fan to move cooling air through the computer cabinet, past the computer modules, between the first and second acoustic panels, and into the room through the opening.

41. The method of claim 40 wherein positioning a first acoustic panel includes positioning a panel having a porous core.

42. The method of claim 40 wherein positioning a first acoustic panel includes positioning a panel having a first perforated face sheet attached to a first porous core.

43. The method of claim 40 wherein positioning the first acoustic panel proximate to the outlet of the fan includes mounting the first acoustic panel on a housing of the fan.

44. The method of claim 40 wherein operating the fan to move the cooling air through the computer cabinet includes drawing the cooling air upwardly through the computer cabinet before passing the cooling air between the first and second acoustic panels and through the opening.

45. The method of claim 40 wherein mounting a fan to the computer cabinet includes mounting a centrifugal fan to an upper portion of the computer cabinet.

46. A method for cooling a plurality of computer modules carried by a computer cabinet in a room, and for absorbing acoustic noise associated with the cooling, the method comprising:

mounting a fan to the computer cabinet;

positioning a first acoustic panel proximate to an outlet of the fan;

positioning the fan within an aperture of a second acoustic panel, thereby positioning the second acoustic panel proximate to the outlet of the fan and spaced apart from the first acoustic panel to form an opening; and operating the fan to move cooling air through the computer cabinet, past the computer modules, between the first and second acoustic panels, and into the room through the opening.

47. A system for performing high-speed computations in a room, the system comprising:

means for holding at least one computer module;

means for moving a flow of cooling air past the computer module;

first acoustic panel means for absorbing acoustic noise generated by the air moving means, wherein the first acoustic panel means are positioned proximate to the air moving means, and wherein the first acoustic panel means extend for at least approximately 360 degrees around the air moving means; and second acoustic panel means for absorbing acoustic noise generated by the air moving means, wherein the second acoustic panel means are positioned proximate to the air moving means and extend for at least approximately 360 degrees around the air moving means, and wherein the second acoustic panel means are spaced apart from the first acoustic panel means to form an opening configured to direct the flow of cooling air away from the computer module holding means and into the room.

48. The system of claim 47 wherein the air moving means are mounted to the computer module holding means.

49. The system of claim 47 wherein the air moving means are mounted to the computer module holding means, and wherein the first and second acoustic panel means are at least partially supported by the air moving means.

50. The system of claim 47 wherein the opening formed by the first and second acoustic panel means extends for at least approximately 360 degrees around the air moving means.

* * * * *